United States Patent
O'Shea et al.

(10) Patent No.: US 10,338,189 B2
(45) Date of Patent: Jul. 2, 2019

(54) METADATA-BASED EMITTER LOCALIZATION

(71) Applicant: HawkEye 360, Inc., Herndon, VA (US)

(72) Inventors: Timothy James O'Shea, Arlington, VA (US); Nicholas Aaron McCarthy, Arlington, VA (US); Darek Kawamoto, Herndon, VA (US); Edward Kreinar, Springfield, VA (US)

(73) Assignee: HawkEye 360, Inc., Herndon, VA (US)

( * ) Notice: Subject to any disclaimer, the term of this patent is extended or adjusted under 35 U.S.C. 154(b) by 0 days.

(21) Appl. No.: 16/166,579

(22) Filed: Oct. 22, 2018

(65) Prior Publication Data
US 2019/0120928 A1    Apr. 25, 2019

Related U.S. Application Data

(60) Provisional application No. 62/575,097, filed on Oct. 20, 2017.

(51) Int. Cl.
*H04W 64/00* (2009.01)
*G01S 5/02* (2010.01)
(Continued)

(52) U.S. Cl.
CPC ............ *G01S 5/0236* (2013.01); *G01S 1/022* (2013.01); *G01S 1/04* (2013.01); *G01S 5/06* (2013.01)

(58) Field of Classification Search
CPC . H04W 64/00; H04W 64/003; H04W 64/006; H04W 68/00; H04W 4/02;
(Continued)

(56) References Cited

U.S. PATENT DOCUMENTS

| | | | |
|---|---|---|---|
| 5,570,099 A | 10/1996 | Desjardins | |
| 9,661,604 B1 | 5/2017 | O'Shea et al. | |
| 2008/0280624 A1* | 11/2008 | Wrappe | G01S 1/68 455/456.1 |
| 2011/0153816 A1* | 6/2011 | Lloyd | H04L 47/14 709/224 |

(Continued)

FOREIGN PATENT DOCUMENTS

WO    WO 2009/078536    6/2009

OTHER PUBLICATIONS

International Search Report and Written Opinion in International Application No. PCT/US2018/056890, dated Jan. 23, 2019, 14 pages.

*Primary Examiner* — Jean A Gelin
(74) *Attorney, Agent, or Firm* — Fish & Richardson P.C.

(57) ABSTRACT

A method includes obtaining signal information corresponding to a plurality of radio signals received at two or more sensing devices from a candidate location, determining a plurality of reconstructed signals based on the signal information, determining time-estimates and frequency-estimates based on a correlation between the plurality of radio signals and the plurality of reconstructed signals, determining metadata corresponding to the plurality of radio signals based on the signal information, the time-estimates, or the frequency-estimates, transmitting at least a portion of the metadata to an information combining node, obtaining the portion of the metadata from the information combining node, determining a relationship between the metadata, and determining the candidate location based on the metadata and the relationship between the metadata. Transmission of the plurality of radio signals to the information combining node is restricted based on a bandwidth of the two or more sensing devices or the information combining node.

29 Claims, 7 Drawing Sheets

(51) Int. Cl.
*G01S 1/04* (2006.01)
*G01S 1/02* (2010.01)
*G01S 5/06* (2006.01)

(58) Field of Classification Search
CPC ......... H04W 4/046; H04W 4/40; H04W 4/50; H04W 84/005; H04W 8/22; H04W 24/10; G01S 1/04; G01S 1/022; G01S 5/0236; G01S 5/0242; G01S 5/0284; G01S 5/06; G01S 5/02
See application file for complete search history.

(56) References Cited

U.S. PATENT DOCUMENTS

| | | | |
|---|---|---|---|
| 2011/0213681 A1* | 9/2011 | Shahid | G06Q 30/02 705/27.1 |
| 2011/0219097 A1* | 9/2011 | Crockett | G06F 15/16 709/219 |
| 2014/0129934 A1* | 5/2014 | Hogg | G06F 9/453 715/708 |
| 2015/0327265 A1* | 11/2015 | Lee | H04W 72/0446 370/311 |
| 2015/0356289 A1* | 12/2015 | Brown | G06F 21/44 726/7 |
| 2016/0054425 A1* | 2/2016 | Katz | G01S 3/14 342/417 |
| 2016/0094600 A1* | 3/2016 | Besehanic | H04L 65/4084 709/219 |
| 2017/0102466 A1 | 4/2017 | Petkus et al. | |
| 2018/0351826 A1* | 12/2018 | Ahlport | G06F 3/04842 |

\* cited by examiner

METADATA-BASED EMITTER LOCALIZATION

CROSS REFERENCE TO RELATED APPLICATIONS

This application claims the benefit of priority under 35 U.S.C. § 119(e) of U.S. Provisional Application No. 62/575,097, filed on Oct. 20, 2017, and entitled "Distributed System for Metadata Based Many-Emitter Localization," which is incorporated herein by reference in its entirety.

TECHNICAL FIELD

The following disclosure relates generally to systems and techniques for determining emitter locations based on metadata corresponding to radio signals.

BACKGROUND

Various electrical devices emit radio signals. For example, communications radios, emergency safety beacons, radars, television broadcast towers, wireless access points, cellular towers, cellular phones, and satellite phones, among other radio emitters, transmit radio signals that can be received by other devices.

SUMMARY

The present disclosure describes devices, systems and techniques for determining locations of electrical devices based on receiving, by two or more sensing devices, radio signals emitted by the electrical devices. The radio signals received by the two or more sensing devices are processed to determine metadata descriptive of the received radio signals. A receiver station receives the metadata from the two or more sensing devices, and determines locations of the electrical devices based on the metadata and a relationship between the metadata received from the different sensing devices. In this context, a receiver station that receives metadata from a sensing device is referred to as an information combining node, while an electrical device that emits a radio signal is referred to as an emitter or a wireless transmitter, and a sensing device that receives radio signals from an emitter is referred to as a sensor.

In some implementations, the sensors are located on board two or more mobile platforms. The mobile platforms receive radio signals from emitters, process the radio signals to determine metadata that is descriptive of the received radio signals, and sending the metadata to an information combining node to determine locations of the emitters. The metadata may include, for example, descriptive information corresponding to time-estimates and frequency-estimates of the radio signals arriving at the mobile platforms. In some implementations, the mobile platforms are orbiting satellites. In some implementations, the corresponding information combining node is a satellite ground station.

In some implementations, one or more sensors may perform actions to obtain optimal matching for the radio signal of interest that may have arrived at the one or more sensors with frequency offsets, different pulse shapes, filter parameters, or other variations that may lead to errors or reductions in accuracy for spatial localization if unaddressed. The one or more sensors may limit outgoing communications to the information combining nodes to include only metadata that describes detected emissions rather than full or partial recordings of the radio signals, which may decrease a volume of communications and storage cost at the one or more sensors. In this context, spatial localization refers to operations to locate radio emitters with a certain level of confidence based on analysis of radio signals emitted by the radio emitters. For example, a location or high likelihood region of the radio emitter may be determined based on a frequency or time of the radio signals emitted from the radio emitter. In some cases, a system for spatial localization includes one or more sensors configured to receive radio signals emitted from radio emitters.

According to one aspect of the subject matter described in this application, a method includes: obtaining, from a first sensing device, first information corresponding to a first radio signal received at the first sensing device from a candidate location; determining a first reconstructed signal corresponding to the first radio signal based on the first information; determining at least one of a first time-estimate or a first frequency-estimate based on a correlation between the first radio signal and the first reconstructed signal; and determining first metadata corresponding to the first radio signal based on at least one of the first information, the first time-estimate, or the first frequency-estimate. The method further includes: obtaining, from a second sensing device, second information corresponding to a second radio signal received at the second sensing device from the candidate location; determining a second reconstructed signal corresponding to the second radio signal based on the second information; determining at least one of a second time-estimate or a second frequency-estimate based on correlation between the second radio signal and the second reconstructed signal; determining second metadata corresponding to the second radio signal based on at least one of the second information, the second time-estimate, or the second frequency-estimate.

The method further includes: transmitting at least one of the first metadata or the second metadata to an information combining node; obtaining, from the information combining node, at least one of the first metadata or the second metadata; and determining a relationship between the first metadata and the second metadata, and determining the candidate location based on the first metadata, the second metadata, and the relationship between the first metadata and the second metadata. For example, the method uses one or more or a timing difference of arrival, a frequency difference of arrival, or other relationship included in the metadata to determine likely candidate locations of emitters of radio signals. Transmitting at least one of the first metadata or the second metadata to the information combining node includes restricting transmission of the first radio signal and the second radio signal to the information combining node based on a bandwidth of the first sensing device, the second sensing device, or the information combining node.

Implementations according to this aspect may include one or more of the following features. For example, determining the candidate location may include determining the candidate location based on at least one of the first metadata received at the information combining node or the second metadata received at the information combining node. A bandwidth for transmitting the first metadata from the first sensing device may be less than a bandwidth for transmitting the first radio signal from the first sensing device, and a bandwidth for transmitting the second metadata from the second sensing device may be less than a bandwidth for transmitting the second radio signal from the second sensing device. In the same or other examples, a memory space for storing the first metadata from the first sensing device is less than a memory space for storing the first radio signal from the first sensing device, and a memory space for storing the second metadata from the second sensing device is less than a memory space for storing the second radio signal from the second sensing device.

In some implementations, transmitting at least one of the first metadata or the second metadata to the information combining node may include transmitting the first metadata and the second metadata through a communications bus communicably coupled to the information combining node. For example, the communications bus may have a band of frequencies that includes at least one of a VHF-band, a UHF-band, an S-band, a Ku-band, a Ka-band, or an X-band that are configured to carry a radio signal.

In some implementations, obtaining the first information includes generating a data stream by digitizing the first radio signal, and obtaining, from the data stream, information derived from the first radio signal. For example, obtaining the information derived from the radio first signal may include obtaining, from the data stream, at least one of a time of arrival of the first radio signal at the first sensing device, a frequency of the first radio signal at the time of arrival, a frequency offset associated with the first radio signal, a signal to noise ratio associated with the first radio signal, information bits included in the data stream corresponding to the first radio signal, or a signal parameter that defines one or more features of the first radio signal, such as spectral shape, or frequency roll-off, among others.

In some examples, determining the first reconstructed signal may include determining the first reconstructed signal based on at least one of the time of arrival of the first radio signal at the first sensing device, the frequency of the first radio signal at the time of arrival, the signal to noise ratio of the first radio signal, the signal parameter that defines one or more features of the first radio signal, the information bits included in the first radio signal, or the signal parameter that defines the shape of the first radio signal. In some examples, determining the first metadata corresponding to the first radio signal may include determining descriptive information corresponding to at least one of the time of arrival of the first radio signal at the first sensing device, the frequency of the first radio signal at the time of arrival, the signal to noise ratio of the first radio signal, the information bits included in the first radio signal, or the signal parameter that defines one or more features of the first radio signal.

In some implementations, obtaining the second information may include generating a data stream by digitizing the second radio signal, and obtaining, from the data stream, information derived from the second radio signal. For example, obtaining the information derived from the second radio signal may include obtaining, from the data stream, at least one of a time of arrival of the second radio signal at the second sensing device, a frequency of the second radio signal at the time of arrival, a frequency offset associated with the second radio signal, a signal to noise ratio associated with the second radio signal, information bits included in the data stream corresponding to the second radio signal, or a signal parameter that defines one or more features of the second radio signal.

In some examples, determining the second reconstructed signal may include determining the second reconstructed signal based on at least one of the time of arrival of the second radio signal at the second sensing device, the frequency of the second radio signal at the time of arrival, the signal to noise ratio of the second radio signal, the signal parameter that defines one or more features of the second radio signal, the information bits included in the second radio signal, or the signal parameter that defines one or more features of the second radio signal. In some examples, determining the second metadata corresponding to the second radio signal may include determining descriptive information corresponding to at least one of the time of arrival of the second radio signal at the second sensing device, the frequency of the second radio signal at the time of arrival, the signal to noise ratio of the second radio signal, or the information bits included in the data stream corresponding to the second radio signal.

In some implementations, determining the first metadata corresponding to the first radio signal may include determining descriptive information corresponding to at least one of a first time of arrival at which the first radio signal arrived at the first sensing device, or a first frequency of arrival of the first radio signal received at the first sensing device at the first time of arrival. In such implementations, determining the second metadata corresponding to the second radio signal may include determining descriptive information corresponding to at least one of a second time of arrival at which the second radio signal arrived at the second sensing device, or a second frequency of arrival of the second radio signal received at the second sensing device at the second time of arrival.

In some implementations, determining the candidate location may include obtaining information regarding a trajectory of at least one of the first sensing device or the second sensing device, and identifying a candidate emitter corresponding to the first radio signal and the second radio signal based on at least one of the information regarding the trajectory of at least one of the first sensing device or the second sensing device, the relationship between the first metadata and the second metadata, the first metadata, or the second metadata. For example, identifying the candidate emitter may include obtaining information regarding the candidate emitter, determining whether the first metadata or the second metadata corresponds to the information regarding the candidate emitter, and identifying the candidate emitter based on a determination that the first metadata or the second metadata corresponds to the information regarding the candidate emitter.

In some examples, determining the candidate location may further include determining the candidate location from estimated locations corresponding to the information regarding the candidate emitter, the trajectory of at least one of the first sensing device or the second sensing device, the relationship between the first metadata and the second metadata, the first metadata, and the second metadata. For example, the information regarding the candidate emitter may include at least one of a type of the candidate emitter, a history of locations of the candidate emitter, a travel schedule of the candidate emitter, a frequency band of an emission from the candidate emitter, a frequency offset of the emission, a pulse shape, a modulation parameter, or other signal parameters of the emission, or acoustic content (e.g., voice, music, or other sounds) included in the emission.

In some implementations, obtaining the information regarding the candidate emitter may include obtaining the information regarding the candidate emitter from at least one of the first metadata, the second metadata, the first sensing device, the second sensing device, another sensing device, an information repository, or an internet source that specifies a type of the candidate emitter, a travel schedule of the candidate emitter, information indicating an emitter mode, or a frequency band of an emission from the candidate emitter.

In some implementations, the method may further include storing information corresponding to the candidate emitter and the candidate location in a non-transitory storage medium. In some implementations, the method may further include transmitting information corresponding to the candidate emitter and the candidate location to a communications bus or to an information processing node.

In some implementations, one or both of the first sensing device and the second sensing device may include at least one of a Low Earth Orbit (LEO) satellite, a Medium Earth Orbit (MEO) satellite, a Geosynchronous Orbit (GEO) satellite, a Highly Elliptical Orbit (HEO) satellite, a nano satellite, an unmanned aerial vehicle (UAV), a terrestrial vehicle, a spacecraft, a stationary terrestrial sensor, or a mobile platform. In some cases, the first sensing device includes the second sensing device, and the first sensing device is configured to receive a plurality of radio signals. In such cases, obtaining the second information corresponding to the second radio signal includes obtaining the second information corresponding to the second radio signal that is received at the first sensing device.

In some implementations, the first sensing device or the second sensing device includes the information combining node in which transmitting at least one of the first metadata or the second metadata to the information combining node may include transmitting at least one of the first metadata or the second metadata to one of the first sensing device and the second sensing device that includes the information combining node.

In some implementations, determining the first and second reconstructed signals may include minimizing a distance metric respectively corresponding to a difference between the first reconstructed signal and the first radio signal and between the second reconstructed signal and the second radio signal. For example, the distance metric may include a mean squared value corresponding to the difference between the first reconstructed signal and the first radio signal or the difference between the second reconstructed signal and the second radio signal. Alternatively or in addition, determining the first and second reconstructed signals may include minimizing a cost metric or a cost function, other than the distance metric described above, respectively corresponding to a difference between the first reconstructed signal and the first radio signal and between the second reconstructed signal and the second radio signal.

In some implementations, the information combining node may include a plurality of information combining nodes such as a data center, a ship control center, or a satellite control center.

Implementations of the above techniques include methods, apparatus, computer program products, and systems for performing the above-described actions. Such a computer program product may be embedded in a non-transitory machine-readable medium that stores instructions executable by one or more processors. The instructions are configured to cause the one or more processors to perform the above-described actions. Such a system includes two or more sensing devices, one or more processors, and a storage medium storing instructions that, when executed by the one or more processors, are configured to cause the one or more processors to perform the above-described actions upon receiving radio signals from the sensing devices.

The systems and techniques described herein enable spatial localization of emitters without relying on an algorithm that assumes ability for communicating radio signals or resources for processing the radio signals and additional information (e.g., integration and comparison of the additional information). For instance, a conventional method may include a filter, which may not match well the radio signals, or a data communication link outside of a limited bandwidth for transmission of a correlation output of the radio signals or a compressed version of an ambiguity function corresponding to the radio signals. In this regard, the conventional method may overlook a critical signal processing resource needed for an optimal performance of its subsystems for spatial localization. By contrast, the systems and techniques described herein can provide accurate spatial localization of emitters using sensing devices with limited hardware resources, e.g., bandwidths for communicating the metadata between the sensing devices or between the information combining node and the sensing devices, or limited storage space for holding signal information. In addition, hardware resources (e.g., a capacity of memory, a computing power or speed) for processing the metadata are less than hardware resources for processing the radio signals in conventional approaches.

Accordingly, the techniques described herein are useful to scale the disclosed systems to a distributed system including many sensors configured to receive radio signals from many emitters. For instance, the disclosed techniques based on metadata is useful for spacecraft, e.g., satellites, which have limited processing resources and constrained communication bandwidths. As another example, in a constellation including a plurality of satellites, the techniques described herein are useful to perform localization of one or more emitters based on low bandwidth information sharing techniques between the sensors of the satellites.

The details of one or more disclosed implementations are set forth in the accompanying drawings and the description below. Other features, aspects, and advantages will become apparent from the description, the drawings and the claims.

DETAILED DESCRIPTION

Disclosed are systems and techniques that enable a distributed system for spatial localization of radio emitters based on metadata corresponding to emissions from the radio emitters that are received by a plurality of distributed radio sensor platforms (e.g., small satellites). In some cases, the radio sensor platforms, also referred to as mobile platforms, may be restricted from transferring or storing the raw emissions (e.g., radio signals) due to limited resources. However, the limited resources (e.g., bandwidth, storage space) of the radio sensor platforms may be sufficient to transmit or receive the metadata corresponding to the raw emissions and to store the metadata or localization results (e.g., history of locations of the emitters) based on analysis of the metadata. For instance, the metadata corresponding to radio signals provide descriptive information about the radio signals (e.g., a time instant of arrival, a frequency, a signal parameter, a noise level, content or header bits, etc.), which may significantly reduce resources needed for operations of the radio sensor platforms such as spatial localization operations to locate the radio emitters or more generally store or transmit descriptions of emissions compactly.

In some implementations, the distributed system includes hardware subsystems (e.g., two or more radio sensor platforms, one or more receiver stations) and a corresponding logic that can run on a collection of distributed radio sensor platforms (e.g., on small satellites). Additionally or alternatively, one or more information combining nodes may perform spatial localization of radio emitters without transferring or storing a large amount of information. Transferring or storing a large amount of information may be impractical for a distributed sensor system such as a system of small satellites. A distributed system design is critical to the ability for scaling the number of emitters to be localized, and the number of sensors effectively used for localization, while meeting practical hardware and system constraints.

Figure 1:
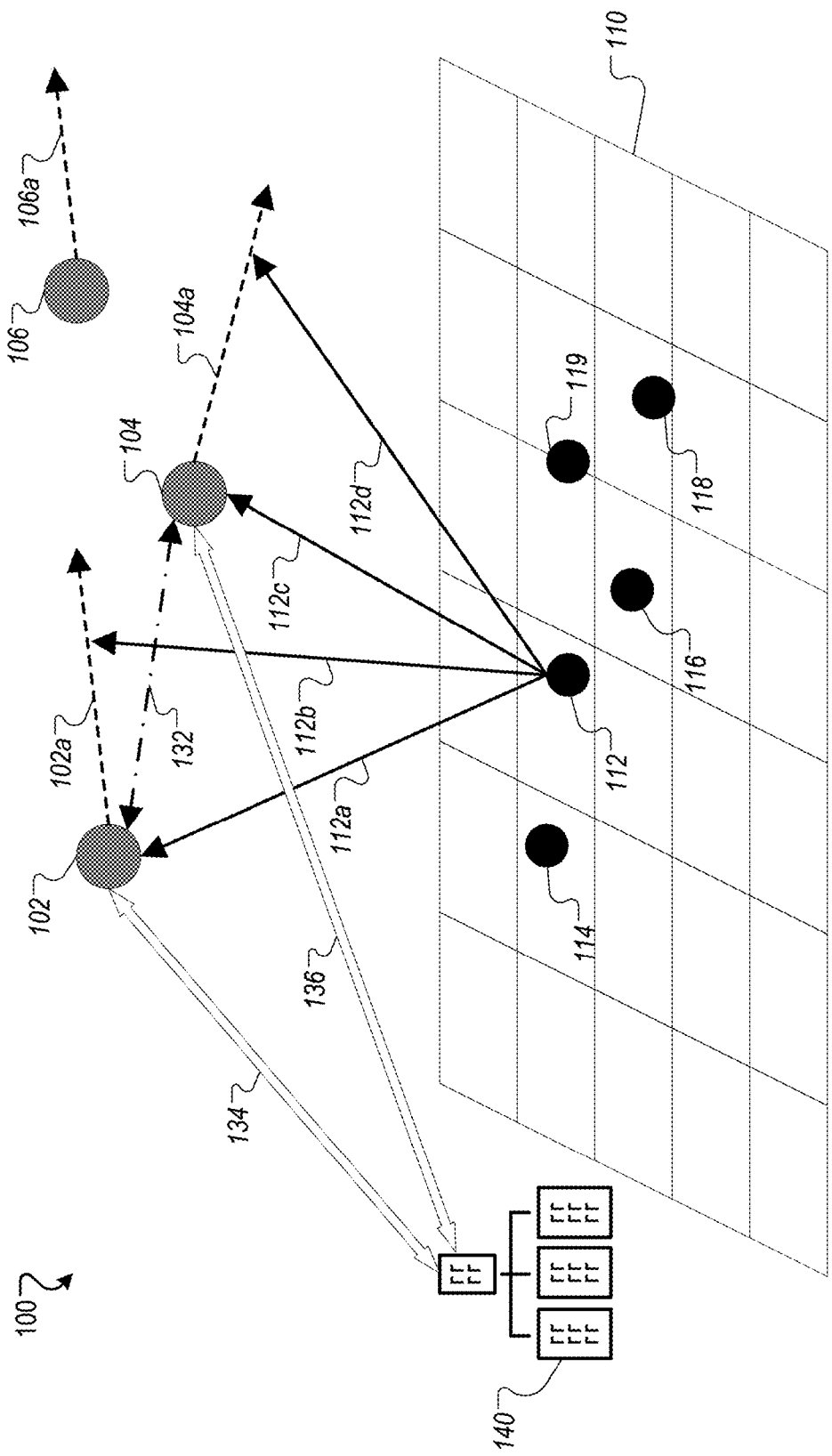
FIG. 1 illustrates an example of a system for determining emitter locations, according to one or more implementations.

FIG. 1 illustrates an example of a system 100 for determining emitter locations, according to one or more implementations. The system 100 includes sensing devices 102, 104 and 106, an area 110 that includes a plurality of emitters that are indicated by candidate emitter locations 112, 114, 116, 118, and 119, and an information combining node 140.

In some implementations, the sensing devices 102, 104 and 106 are mobile apparatus, such as spacecraft, aerial vehicles, terrestrial vehicles, or some or suitable mobile platforms. For example, the sensing devices 102, 104, and 106 are satellites. Alternatively, the sensing devices 102, 104, and 106 are cars, trucks, or ships. Alternatively, the sensing devices 102, 104, and 106 are aerial vehicles such as airplanes, or unmanned aerial vehicles (UAVs) such as drones or balloons. In some implementations, the sensing device 102 is a first type of mobile platform, while the sensing devices 104 and 106 are a second type of mobile platform that is different from the first type of mobile platform. For example, the sensing device 102 can be a satellite, while the sensing devices 104 and 106 can be terrestrial vehicles, or vice versa. Alternatively, the sensing device 102 can be a satellite, the sensing device 104 can be a terrestrial vehicle, and the sensing device 106 can be an UAV.

Each sensing device includes one or more radio signal receivers, also referred to as sensors, which are configured to receive radio signals from emitters. In some implementations, the sensors correspond to radio frequency (RF) antennas coupled to transponders and/or network interfaces on board the sensing devices. Each sensing device can also include other hardware components, such as a digitizer (e.g., an analog to digital converter, or ADC) that converts the received analog radio signals to digital format, one or more processors, and memory that stores instructions corresponding to operations performed by the sensing device, and also stores the radio signal data and/or processed information generated based on the radio signal data.

Although three sensing devices 102, 104, and 106 are shown, in some implementations the system 100 includes a different number of sensing devices. For example, the system 100 can include two sensing devices (e.g., 102 and 104) or four or more sensing devices.

In some implementations, the area 110 is a geographic region on the Earth's surface or oceans. In some implementations, the area 110 is a region of space that is proximate to the Earth's surface or oceans, e.g., at a height of a few feet to a few tens or hundreds of feet above ground. The emitters corresponding to the candidate locations 112, 114, 116, 118, and 119 include one or more of emergency safety beacons, radars, marine radars, automatic identification system (AIS) transceivers, television broadcast towers, wireless access points, wireless transmitters, cellular towers, cellular phones, and satellite phones, among other radio emitters. In some implementations, different emitters corresponding to the candidate locations 112, 114, 116, 118, and 119 are of different types. In other implementations, the emitters corresponding to the candidate locations 112, 114, 116, 118, and 119 are of the same type. Each emitter includes hardware, such as one or more communications radios or other types of radio transmitters (e.g., radar), which transmit radio signals that can be received by other devices, such as the sensing devices 102, 104, and/or 106.

The sensing devices 102, 104, and 106 are mobile, with sensing device 102 moving with a trajectory 102a, sensing device 104 moving with a trajectory 104a, and sensing device 106 moving with a trajectory 106a. Depending on the type of the sensing device, the movement of the sensing devices 102, 104 and 106 are in space in some implementations, or on the terrestrial surface in some other implementations. In implementations where one or more of the sensing devices are aerial platforms, the sensing devices follow trajectories through space. For example, the sensing devices can include satellites that follow orbital trajectories with respect to the Earth's surface. Alternatively, in implementations where one or more of the sensing devices are terrestrial vehicles, the sensing devices follow trajectories on the ground. For example, the sensing devices can include cars or trucks that travel on the Earth's surface, either along marked roads or on unmarked areas. As another example, the sensing devices can include boats or ships that travel on water, such as the oceans.

During movement of the sensing devices 102, 104, and 106 along their respective trajectories, the sensing devices 102, 104, and 106 receive radio signals from one or more emitters located at one or more of the candidate locations 112, 114, 116, 118, and 119. For example, during a known time interval, the sensing device 102 receives radio signal 112a from an emitter at candidate location 112 when the sensing device 102 is at a first location in its trajectory 102a, and subsequently receives radio signal 112b from the emitter at the candidate location 112 when the sensing device 102 is at a second location in its trajectory 102a during the time interval. The sensing device 104 receives radio signal 112c from the emitter at the candidate location 112 when the sensing device 104 is at a first location in its trajectory 104a, and subsequently receives radio signal 112d from the emitter at the candidate location 112 when the sensing device 104 is at a second location in its trajectory 104a. In some implementations, one of the radio signals 112a or 112b is same as one of the radio signals 112c or 112d.

For example, a signal emitted by the emitter at the candidate location 112 at a time instant and received by the sensing device 102 can be referred to as the radio signal 112a, while the same signal received by the sensing device 104 can be referred to as the radio signal 112c. Additionally or alternatively, a signal emitted by the emitter at the candidate location 112 at a second time instant and received by the sensing device 102 can be referred to as the radio signal 112b, while the same signal received by the sensing device 104 can be referred to as the radio signal 112d. One or more of the sensing devices 102, 104 and 106 can similarly receive radio signals from other emitters while moving along their respective trajectories.

In some implementations, time delay and Doppler frequency offset trajectories are computed for the sensing devices based on the received signals along the paths to specific candidate spots in the area 110. In this context, time delay is due to the propagation of electromagnetic waves through free space as they travel between an emitter and a receiving sensor. In some instances, different characteristics of the propagation (e.g., timing, distortion, or frequency of signal arrival) is affected by additional mediums or effects, such as effects due to propagation through the ionosphere, dispersion, or due to other sources that can be modeled and accounted for distinct from a free space model. The Doppler frequency offset refers to the translation of the center frequency of a signal due to relative velocity differences between the signal emitter and the sensor receiving the signal. By computing the time delay and Doppler frequency offset trajectories from the known paths of the sensing devices, signals arriving from a particular location can be coherently added. For example, time delay and Doppler frequency offset trajectories are computed for the sensing devices 102 and 104 based on their known trajectories 102a and 104a, respectively. Following computation of the time delay and Doppler frequency offset trajectories for the sensing devices 102 and 104, the signals from the emitter at the candidate location 112 that are received at the sensing device 102 (e.g., on one or more of the radio signals 112a and 112b), and the signals from the emitter at the candidate location 112 that are received at the sensing device 104 (e.g., one or more of the radio signals 112c and 112d) are coherently added.

As noted above, in some implementations, one or more of the sensing devices 102, 104, and 106 are satellites. In such cases, the satellites include one or more of a Low Earth Orbit (LEO) satellite, a Medium Earth Orbit (MEO) satellite, a Geosynchronous Orbit (GEO) satellite, a Highly Elliptical Orbit (HEO) satellite, a nano satellite, or an unmanned aerial vehicle (UAV). In some implementations, some of the sensing devices are satellites while the others are different types of mobile platforms, e.g., aerial or terrestrial vehicles. The different types of sensing devices in a multi-platform implementation can contribute to greater diversity or increased differentiation of values of delay and Doppler offset between the sensing devices. In some implementations, radio signals may be received at the plurality of sensing devices (e.g., sensing devices 102, 104, and 106) from a plurality of candidate emitter locations (e.g., from emitters corresponding to the candidate locations 112, 114, 116, 118, and 119).

In some implementations, the information combining node 140 receives metadata corresponding to radio signals received at sensing devices, and performs spatial localization of emitters that has emitted the radio signals. For example, a communications link 134 is established between the sensing device 102 and the information combining node 140, while a communications link 136 is established between the sensing device 104 and the information combining node 140. In some examples, the metadata corresponding to the radio signals determined at the sensing devices may be transmitted to one or more receiver station such as an information combining node 140. Each of the communications link 134 and the communications link 136 has a sufficient bandwidth for transferring the metadata corresponding to the radio signals received at the respective sensing devices, while the bandwidth may be limited for transferring the radio signals, a compressed radio signals, or a portion of the radio signals. In some instances, these communications links are intermittent, for instance, when not in touch with a ground station, in which messages may be queued or stored for later transmission (e.g., upon link establishment). In other instances, the communications links are always maintained to enable communication between the sensing device and the ground station.

For example, the sensing device 102 sends to the information combining node 140, over the communications link 134, first metadata that are determined at the sensing device 102 based on a first radio signal such as the radio signals 112a and 112b emitted from the emitter at the candidate location 112. Similarly, the sensing device 104 sends to the information combining node 140, over the communications link 136, second metadata that are determined at the sensing device 104 based on a second radio signal such as the radio signals 112c and 112d received from the emitter at the candidate location 112.

In some implementations, the information combining node 140 may control and/or monitor the operations performed by the sensing devices. For example, the information combining node 140 sends instructions to the sensing devices 102, 104 and/or 106, to control the movement of the sensing devices along their respective trajectories, to operate their sensors to receive signals from ground emitters, and/or to send the metadata to the information combining node 140 at preselected time intervals or upon determination of the metadata. The instructions sent from the information combining node 140 control at what locations along the respective trajectories (e.g., along trajectory 102a for sensing device 102 or along trajectory 104a for sensing device 104) the sensing devices operate their corresponding sensors to receive the signals. In some cases, the information combining node 140 may also utilizes the trajectory information as well as the metadata to perform spatial localization.

The information combining node 140 may include a gateway with RF transponders or an optical communication link, which receives the metadata from the sensing devices 102, 104, and 106 in some implementations. For example, when one or more of the sensing devices are spacecraft, the information combining node 140 can include a terrestrial satellite gateway that communicates with the spacecraft. In some implementations, one or more of the sensing devices 102, 104, and 106, among others, forward to the gateway the metadata corresponding to radio signals that are received at the sensing devices from the emitters.

In some implementations, the sensing device 104 sends, over a communications link 132 established between the sensing devices 102 and 104, the metadata that are determined at the sensing device 104 based on radio signals such as the radio signals 112c and 112d received from the emitter at the candidate location 112. In such implementations, a sensing device (e.g., sensing device 102) may perform operations for spatial localization of the emitter (e.g., the emitter at the candidate location 112) based on the metadata determined at the sensing device 102 and the metadata received from a different sensing device (e.g., sensing device 104).

In some implementations, a sensing device may control and/or monitor the operations performed by the other sensing devices. For example, the sensing device 102 sends instructions to the sensing devices 104 and/or 106, to control the movement of the sensing devices along their respective trajectories, to operate their sensors to receive signals from ground emitters, and/or to send the metadata to the information combining node 140 or the sensing device 102 at preselected time intervals or upon determination of the metadata. The instructions sent from the sensing device 102 control at what locations along the respective trajectories (e.g., along trajectory 104a for sensing device 104) the sensing devices operate their corresponding sensors to receive the signals.

The information combining node 140 performs the various computations based on receiving the metadata from the sensing devices. In some implementations, operations for spatial localization of emitters based on the metadata are performed at the information combining node 140 within a datacenter environment. The techniques for spatial localization can be executed at the site of the information combining node 140, or forwarded (e.g., through a dedicated physical communications link or over an Internet connection) to a datacenter that is connected to the information combining node 140.

Figure 2A:
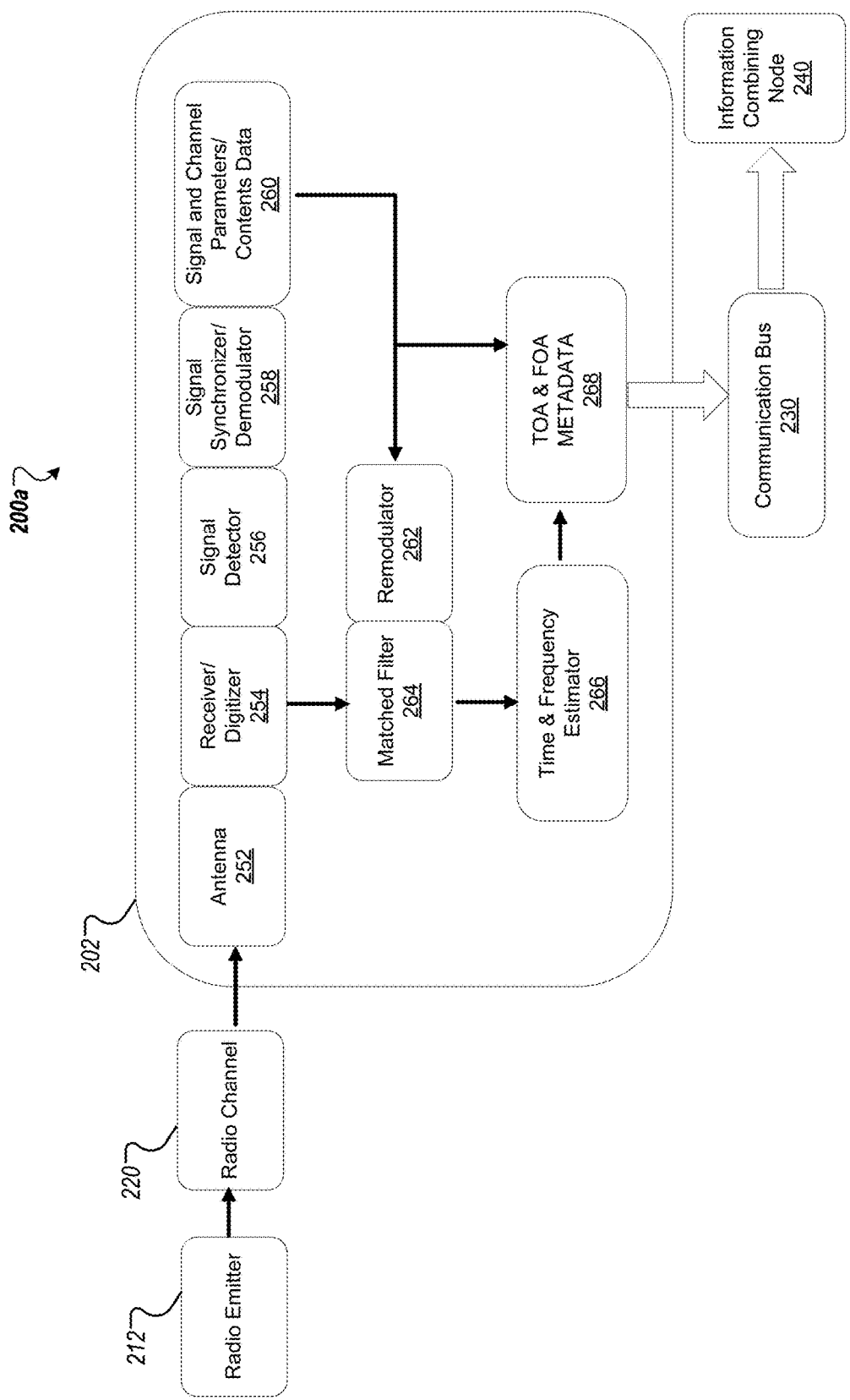
FIG. 2A illustrates a block diagram of an example of a single sensing device in a distributed localization system, according to one or more implementations.

FIG. 2A illustrates a block diagram of an example of a distributed localization system 200a, according to one or more implementations. The system 200a includes a sensing device 202 that receives radio signals emitted from a radio emitter 212 through a communication path, e.g., a radio channel 220, and an information combining node 240 that receives metadata corresponding to the radio signal from the sensing device 202 through a communications bus 230. In some examples, the system 200a may include one or more sensing devices 202, and one or more information combining nodes 240. The system 200a may correspond to the system 100 in FIG. 1, and the sensing device 202 may corresponds to any one of the sensing devices 102, 104, or 106 in FIG. 1.

In some implementations, the sensing device 202 includes an antenna 252 that receives radio signals, a digitizer 254 (e.g., an ADC) that coverts the received radio signals to a data stream of discrete digital signals, a signal detector 256 that monitors the data stream to detect an occurrence of an emission from the emitter 212, and a signal demodulator 258 that determines information derived from the radio signals based on the data stream. In some implementations, the sensing device 202 further includes a remodulator 262 that generates reconstructed signals based on the information derived from the radio signals, a matched filter 264 that generates a correlation between the radio signals and the reconstructed signals, and a time & frequency estimator 266 that determines a time of arrival (TOA) and a frequency of arrival (FOA) of the radio signals. The sensing device 202 determines a metadata 109 that includes one or more of TOA and FOA results.

In some examples, as described above, a radio emitter 212 (e.g., cellular radio towers, broadcast radio towers, ships with beacons, vehicles with voice or data communications radios, etc.) emits radio signals through one or more radio channels 220 in radio frequencies. The sensing device 202 receives the radio signals that may have been attenuated, distorted, or delayed through propagation through the radio channel 220 prior to reception by the sensing device 202 (e.g., a small satellite). For example, the sensing device 202 receives wireless emissions such as the radio signals using the antenna 252 that detects radio frequency. The sensing device 202 further includes a receiver or tuner and a digitizer 254, which process (e.g., tune and digitize) the radio signals detected by the antenna 252. For example, the digitizer 254 converts the received analog radio signal to digital signals to generate a data stream of digital signals.

The sensing device 202 includes a signal detector 256 that monitors the data stream generated by the digitizer 254 to detect an occurrence of an emission that matches predetermined properties of a target signal type. For example, the signal detector 256 may include a matched filter, a cyclostationary detector, an energy detector, or other detection methods and algorithms that look for an occurrence of an emission in the data stream of the digitized radio signals and that look for matching between the emission and certain properties of a target signal type (e.g., cyclostationary properties, energy, preamble values, etc.).

The sensing device 202 includes a signal synchronizer/demodulator 258 that determines, from the data stream, information 260 derived from the radio signals. For example, the demodulator 258 includes one or more of a symbol timing tracking loop, a carrier tracking loop, and a symbol value estimator that can derive the information from the data stream. The demodulator 258 determines one or more of a time instant of the radio signal received at the sensing device 202, a frequency of the radio signal, a rate of the received signal (e.g., a symbol rate), a measure of signal fidelity (e.g., a signal to noise ratio, received signal strength, or a bit error rate), and the information bits or voice contents transmitted from the emitter.

In some implementations, the information 260 derived from the radio signals may include signal and channel parameters such as the time of arrival at the sensing device 202, a propagation time from the emitter 212 to the sensing device 202, a frequency of arrival at the sensing device 202, Doppler offset, estimated velocity vectors corresponding to the radio signals, etc. In some other implementations, the information 260 may include information bits or voice contents obtained from the received signals. In some cases, the information 260 may also include prior knowledge about the radio signals such as a type of signal and a signal parameter that defines one or more features of the radio signals (e.g., a pulse shape that envelops the radio signals). Thus, the information 260 describes an arrival mode (e.g., channel state information) of the radio signals as well as data description and/or contents (e.g., information bits, modulation parameters, a pulse shape, an arrival time, an arrival frequency, symbol rate, impulse response, other signal parameters, etc.). The channel state information may include a channel impulse response related to a noise level, a time delay, an attenuation level of the emission during the propagation through the radio channel 220.

The sensing device 202 may further include a remodulator 262 that generates a reconstructed signal corresponding to the radio signals using the information 260 determined by the demodulator 258 such as contents data, signal and channel parameters, and channel state information (e.g., a precise time of arrival, a frequency of arrival, a channel impulse response). For example, the remodulator 262 performs reconstruction of what the received signal should have looked like as a time-domain signal using the information 260. The reconstructed signals may be very similar to the received radio signal in a frequency domain as well as in the time domain. In some cases, the reconstructed signal may be a near-perfect match to the received radio signal, which minimizes a mean squared value or another cost function between the reconstructed signal and the raw uncorrected arriving signal emission at the sensing device 202, for instance.

The sensing device 202 further includes a matched filter 264 that performs a correlation (e.g., a cross-correlation, or other cost function computation) with the reconstructed signals and the received radio signals to produce a precise correlation peak estimate for the radio signals. Based on a degree of matching between the reconstructed signals and the received radio signals, the matched filter may estimate or refine a precise correlation peak, while the demodulator 285 or another reception/synchronization algorithm, described above, determines a rough estimate of the time instant and the frequency of the received radio signals. Based on the results from the matched filter 264, the fine time & frequency estimator 266 determines a high accuracy estimate of time and frequency of the radio signals received at the sensing device 202. Alternatively or in addition, in some implementations, the sensing device 202 includes a detection algorithm or detection method that is different from the matched filter 264 and that minimizes a cost function such as a mean squared value. For example, the detection method may include determining a value within a predetermined range from a minimum value or a maximum value of a cost-surface of the cost function.

A metadata data structure (or simply metadata 268) describes when and how a radio emission arrived at a sensing device and what data and parameters were included in such a radio emission. For example, the metadata 268 includes the estimated values obtained by the time & frequency estimator 266. In some examples, the metadata 268 includes the fine time estimate and the fine frequency estimate at assigned addresses or field names such as Time of arrival (TOA) and Frequency of arrival (FOA) in the metadata data structure. In some instances, the metadata 268 may include fields from the emission data or header fields, for example for AIS emissions this could include ship identification numbers, radio call signs, vessel names, or other received values encoded or derived from the emissions. For other types of emissions, other similar relevant fields may be alternatively included. In some implementations, the metadata 268 may be a compressed as JavaScript Object Notation (JSON) string-encoded items, keys and/or values, or as a compact binary encoding of the corresponding values, for example, using protocol buffers or protobufs, or using a C programming language-style numerical encoding method (e.g., a C "struct" data structure). Table 1 below shows one example of the metadata structure. Although the example metadata structure shown in Table 1 includes seven data field names and data types (e.g., using a suitable encoding, such as using C programming language encoding), the metadata may include different field names and data types and different numbers of field names and data types.

TABLE 1

An example metadata structure

| Data Type (bytes) | Field Name |
|---|---|
| Int32 (4) | Checksum 32bit |
| float32 (4) | Signal to noise ratio |
| float64 (8) | Signal frequency of arrival |
| Int64 (8) | Emission Integer Time in seconds |
| float64 (8) | Emission time in fractional seconds |
| bytes [256] (256) | Buffer of emission data |
| dictionary (variable) | Other annotations describing emission |

The system 200a includes an information combining node 240 and a communications bus 230 to transmit and/or receive the metadata corresponding to radio signals. For example, the metadata descriptive of the radio signals are transmitted over a communications bus 230 that includes a band of frequencies such as a VHF-band, a UHF-band, an S-band, a Ku-band, a Ka-band, an X-band, or other band of radio frequencies that are configured to carry a digital radio signal. The information combining node 240 (e.g., a ground station or another satellite) receives the metadata through the communications bus 230. In some implementations, the system 200a may include one or more information combining nodes 240 such as a data center, a ship control center, or a satellite control center, a space station, or other satellites. The information combining node 240 receives metadata from two or more sensing devices included in a distributed system and combines the received metadata to determine or estimate a location of the radio emitter 212.

Figure 2B:
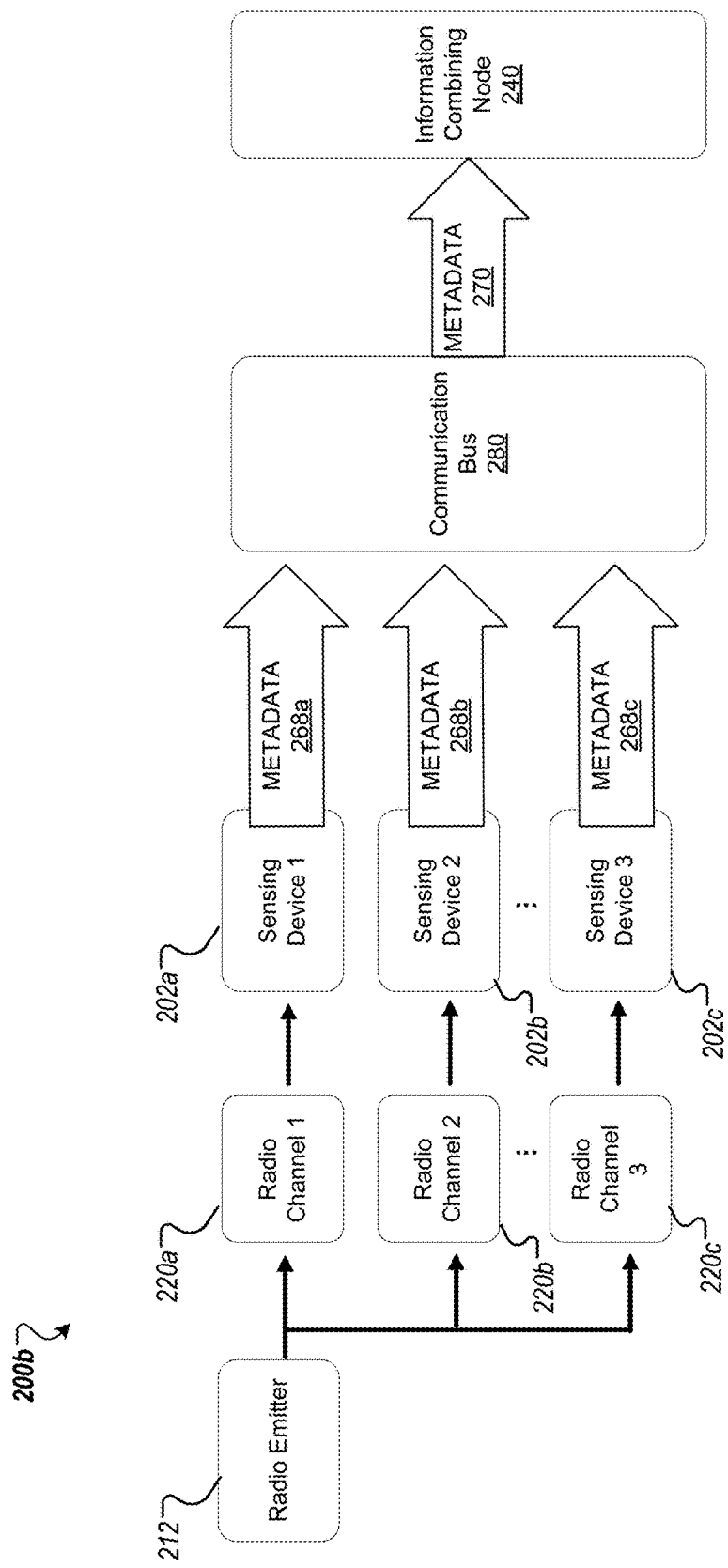
FIG. 2B illustrates a block diagram of an example of multiple sensing devices in a distributed localization system, according to one or more implementations.

FIG. 2B illustrates a block diagram of an example of a distributed multi-sensor system 200b that includes two or more sensing devices 202a, 202b, and 202c configured to receive radio emissions from a radio emitter 212 through multiple radio channels 220a, 220b, and 220c. In some implementations, one or more of the sensing devices 202a, 202b, and 202c correspond to one or more of the sensing devices 102, 104, and 106 in FIG. 1 or the sensing device 202 in FIG. 2A. Although three sensing devices 202a, 202b, and 202c are shown in FIG. 2B, in some implementations the system 200b includes a different number of sensing devices. For example, the system 100 can include two sensing devices (e.g., 202a and 202b) or four or more sensing devices.

The system 200b further includes an information combining node 240 that receives metadata 268a, 268b, 268c, or metadata 270 through a communications bus 280. In some cases, the metadata 270 may include all or a portion of the metadata 268a, 268b, and 268c. For example, the information combining node 240 may be able to determine a location of the emitter based on the metadata 270 received from two sensing devices (e.g., sensing devices 202a and 202b) within a certain accuracy level. In such cases, the information combining node 240 may receive the metadata from the two sensing devices 202a and 202b to determine the location of the emitter 212. The information combining node 240 aggregates the received metadata 270 to perform estimation of a location of the emitter 212. The information combining node 240 may correspond to the information combining node 140 in FIG. 1 or the information combining node 240 in FIG. 2A. In some examples, one or more of the metadata 268a, 268b, and 268c, or 270 may correspond to the metadata 268 in FIG. 2A.

In some implementations, each of the multiple sensing devices 202a, 202b, and 202c receives an emission (e.g., a radio frequency signal) from a radio emitter 212 over a plurality of radio channels (e.g., paths) 220a, 220b, and 220b. In some examples, each sensing device receives the emission over a single channel mode. For instance, the sensing device 202a receives the emission through the radio channel 220a, the sensing device 202b receives the emission through the radio channel 220b, and the sensing device 202c receives the emission through the radio channel 220c.

In other implementations, a sensing device may possibly receive the emission propagated through multiple channels that are different from one another. For example, if a reflection causes two or more copies of an emission, a sensing device (e.g., sensing device 202a) receives the two or more copies of an emission through two or more distinct paths (e.g., radio channels 220a, 220b, and 220c). Since each of the radio channels 220a, 220b, and 220c may have different propagation characteristics such as a type of a medium, a density of the medium, a temperature in the path, a noise level, or obstacles, the radio signals received at the sensing devices 202a, 202b, and 202c may correspond to different values of parameters in terms of a time delay, a frequency offset, a noise level, or other distortions. In such implementations, the metadata 268a, 268b, and 268c may include different data values from each other for the emission emitted from the same emitter 212 in which the information combining node 240 may be able to estimate the location of the emitter 212 based on one or more of the metadata 268a, 268b, 268c, and 270.

Figure 3:
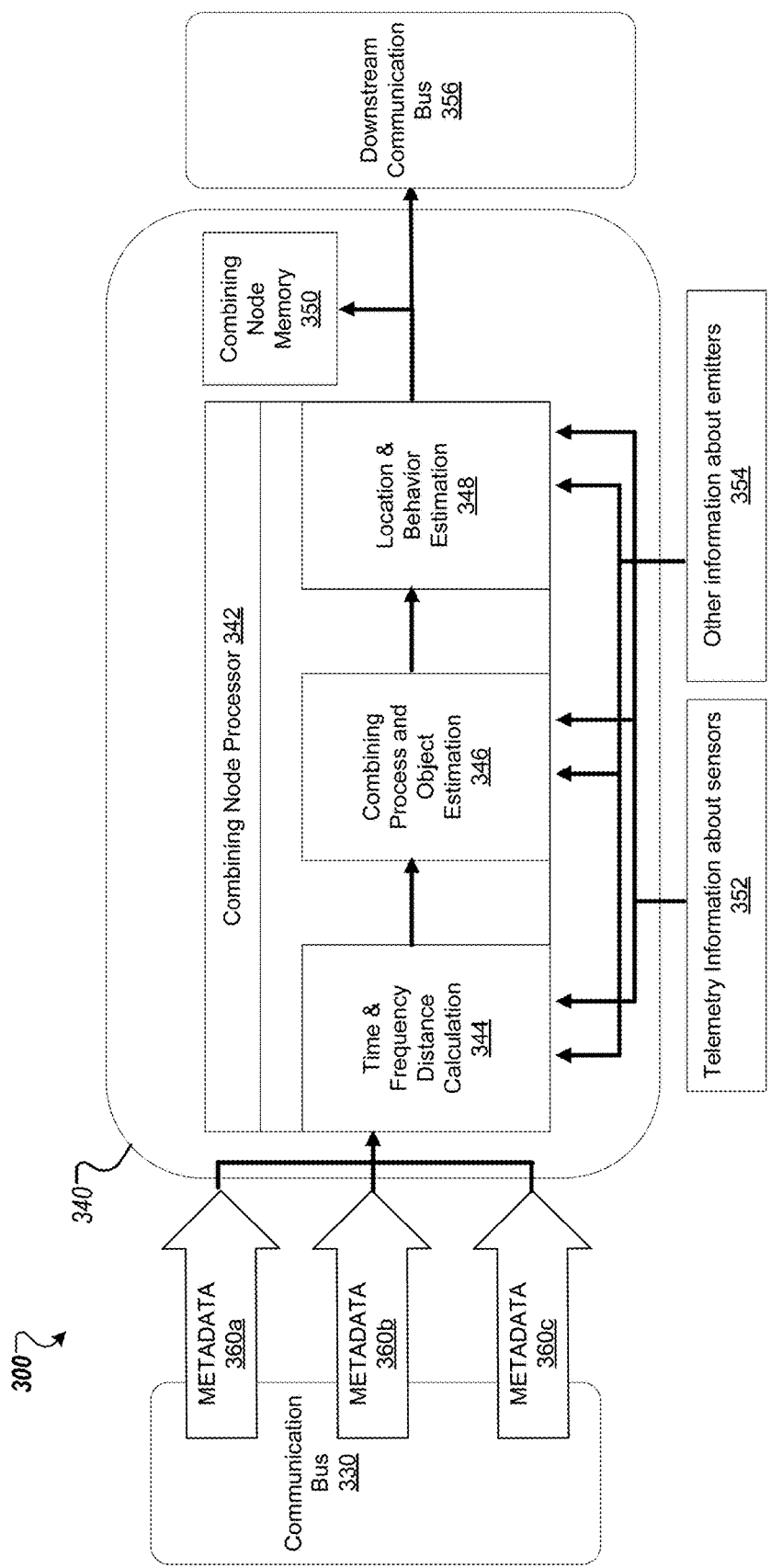
FIG. 3 illustrates a block diagram of an example of an information combining node in a distributed localization system, according to one or more implementations.

FIG. 3 illustrates a block diagram of an example of an information combining node 340 that determines a location of an emitter based on one or more of metadata 360a, 360b, and 360c corresponding to emission from the emitter. In some implementations, the information combining node 340 corresponds to the information combining node 140 in FIG. 1 or the information combining node 240 in FIG. 2A or FIG. 2B. For example, the information combining node 340 receives the metadata 360a, 360b, or 360c for one or more emissions through the communications bus 330. In some implementations, the communications bus 330 corresponds to the communications links 134 and 136 in FIG. 1, the communications bus 230 in FIG. 2A, or the communications bus 280 in FIG. 2B. The information combining node 340 includes one or more processors 342 that perform operations for location estimation, and one or more memory devices 350 that store metadata or location estimation results (e.g., history of location of an emitter) based on the metadata. In some implementations, the information combining node 340 may include multiple processors, which are collectively indicated as the one or more processor 342.

The one or more processors 342 of the information combining node 340 perform processes to determine a location of an emitter. For example, the one or more processors 342 perform a time & frequency distance calculation process 344 (e.g., computing the differences between time and frequency of multiple emissions and corresponding geometry or other effects), combining and object estimation process 346, and location and behavior estimation process 348. The one or more processors 342 receive two or more of the metadata 360a, 360b, and 360c, and telemetry information 352 about the respective sensing devices that sent the metadata 360a, 360b, and 360c, respectively. For instance, the telemetry information 352 includes trajectory information of the sensing devices such as a position, a velocity, or a travel time or schedule of each sensing device. In some implementations, the telemetry information may be included in the respective metadata. In other implementations, the telemetry information may be stored at the information combining node, e.g., at the memory 350. In some cases, the sensing devices may transmit the telemetry information over the communications bus 330 or other communications links along with the metadata. In other cases, the sensing devices may transmit the telemetry information independent of transmission of the metadata.

In some implementations, the one or more processors 342 performs the time and frequency distance calculation process 344 to determine a relationship between the metadata 360a, 360b, and 360c. For example, the one or more processors 342 determine a distance metric or another cost function corresponding to the metadata 360a, 360b, and 360c using the TOA data included in the metadata 360a, 360b, and 360c and position information included in the telemetry information of the corresponding sensing devices. For example, if the TOA in the metadata 360a and the TOA in the metadata 360b are equal to or similar to each other, a candidate location of the emitter may be at a position between positions of two sensing devices that sent the metadata 360a and the metadata 360b. The telemetry information such as velocities of the sensing devices may improve estimation of the candidate location.

In some examples, the one or more processor 324 may determine a distance metric or another cost function using the FOA data included in the metadata 360a, 360b, and 360c and velocity information in the telemetry information of the corresponding sensing devices. For instance, the FOA in the metadata 360a may be different from the FOA in the metadata 360b due to Doppler offset if the corresponding sensing devices move in different velocities.

The one or more processors 342, at the combining process and object estimation process 346, identify an object (e.g., candidate emitter(s)) corresponding to the metadata 360a, 360b, and 360c. In some implementations, the one or more processors 342 may identify a candidate emitter corresponding to the radio signals based on the telemetry information of one or more of sensing devices, the metadata, or the relationship. In some implementations, the one or more processors 342 may also utilize information about candidate emitters.

For example, the information regarding the candidate emitters includes at least one of a type of the candidate emitter, a history of locations of the candidate emitter, a travel schedule of the candidate emitter, a frequency band of an emission from the candidate emitter, a frequency offset of the emission, a pulse shape of the emission, modulation parameters of the emission, or an acoustic content included in the emission. As one example of the information regarding candidate emitters, AIS information of a vessel includes a unique identification, position, course, speed, and frequency band of the vessel, which can be utilized to identify a candidate emitter or vessel. In some implementations, the one or more processors 342 determine one or more candidate emitters based on the combining and object estimation 346 process.

The one or more processors 342 performs the location and behavior estimation process 348 to determine best estimates of the candidate location and the candidate emitter corresponding to the metadata. For example, the one or more processors 342 may utilize an output from the combining and object estimation process 346, which includes one or more of estimated emitters, estimated locations of emitters during emissions, a corresponding time and contents of the emissions. In the location and behavior estimation process 348, the one or more processors 342 determine a best estimate as to the location of the emission from among the estimated locations and a best estimate as to the object (e.g., the emitter) corresponding to the emission from among estimated emitters.

In some implementations, the one or more processors 342 determine information about the current behavior of the emitter. For instance, the one or more processors 342 may determine, based on the best estimates for the candidate location and candidate emitter, whether the candidate emitter (e.g., a vessel or aircraft) is in a restricted area or performs a restricted activity in an area monitored by the sensing devices. In some examples, the one or more processors 342 may also analyze the information bits or acoustic/voice contents included in the metadata to determine the behavior of the emitter.

In some implementations, the one or more processors 342 may utilize other information 354 about the emitter and be configured to perform operations corresponding to one or more of the processes 344, 346, or 348. For example, other information 354 may include prior knowledge about the emitter such as a history of locations or prior behaviors of the emitter, expected locations of the emitter based on prior emissions, locations of other emitters, weather around the estimated locations, surrounding environments around the estimated locations, restricted area information, etc. This information may be provided by one or more of the sensing devices in the same distributed system, other sensing devices in another distributed system, a third party information repository, or an internet source that specifies a type of the candidate emitter, a travel schedule of the candidate emitter, or a frequency band of an emission from the candidate emitter, for instance.

In some implementations, the information combining node 340 includes a memory 350 that stores results from the location & behavior estimation process 348. In some implementations, alternatively or in addition, the results are transmitted via a downstream communications bus 356 to other information processing nodes or objects (e.g., customers, control centers, or other devices) that use information regarding the emitter, a current location of the emitter, and a behavior of the emitter.

In some implementations, the one or more processors 342 execute instructions that are stored in the memory 350. The instructions include operations corresponding to performing spatial localization computations and/or controlling various sensing devices (e.g., one or more of sensing devices 102, 104, and 106) to identify emitter locations based on metadata received from the sensing devices. These operations include, among other things, processing the metadata received from the sensing devices into estimates of locations, users, timing, and other useful signal metrics. The one or more processors 342 output the estimates to a user or administrator, e.g., through a display coupled to the information combining node 340, and/or transmit the estimates to other devices or databases, e.g., other information combining nodes, receiver stations, storage devices, or network nodes.

The memory 350 stores instructions that are executed by the processor(s) 342, as described above. The memory 350 also stores the metadata that are received from one or more sensing devices, and/or results of the computations that are performed by the information combining node 340. In some implementations, the memory 350 stores additional information, such as application logs, process tasking information, planning and analysis information, among other things.

In some implementations, the memory 350 includes one or more of random access memory (RAM), various types of read-only memory (ROM), and other long-term storage memory, such as non-volatile flash memory, hard drive storage, storage disks, or other suitable storage media.

In some implementations, the one or more processors 342 include an embedded microprocessor or field-programmable gate array(s) (FPGA) digital logic subsystem that can improve performance for estimation of the emitter, a location of the emitter, and a behavior of the emitter based on the metadata and knowledge about the emitter. In some examples, the one or more processors 342 include application-specific integrated circuits (ASIC) that can process the metadata received from multiple sensing devices of the distributed system. In other implementations, the one or more processors 342 may include general purpose multi-processors. For example, the one or more processors 342 may include digital signal processing (DSP) features, general-purpose pre-processor(s) (GPP), or general-purpose graphics processing unit(s) (GPGPU).

In some implementations, the one or more processors 342 include parallel processing capabilities, e.g., the one or more processors include GPU hardware. In such cases, the instructions corresponding to operations for the spatial localization based on metadata are customized such that they are executed efficiently using the parallel processors 342. This leads to improvement in the functioning of the information combining node 340, e.g., leading to faster execution, lower expenditure of energy, and/or lower heat generation. In this manner, the parallel execution of the instructions corresponding to operations for the spatial localization based on metadata improves the functionality of the information combining node 340. This is useful, for example, when the information combining node 340 processes a large amount of metadata, e.g., covering a large area and/or multiple areas and that are received from a plurality of sensing devices.

In some implementations, the information combining node 340 includes one communications transponder. In other implementations, the information combining 340 includes multiple communications transponders. In some implementations, the communications transponder(s) include downlink/uplink communications transponder(s), which are used to communicate with the sensing devices, e.g., to transmit command and control instructions, receive emitter signals obtained by the sensors on the sensing devices, or processed information about these signals such as metadata that are generated by one or more sensing devices. In some implementations, the information combining node 340 uses the downlink/uplink communications transponders to send updates to software (e.g., updates to the algorithms) stored in sensing device memory.

In some implementations, the information combining node 340 includes one network interface. In other implementations, the information combining node 340 includes multiple network interfaces. The information combining node 340 connects to one or more terrestrial networks, e.g., using local area network (LAN) or wide area network (WAN) connections, through the network interfaces. The information combining node 340 communicates with other transceiver/receiver stations, satellite ground stations, or other network devices on the ground, or to remote datacenters, through the terrestrial or other networks that are accessed over the network interfaces. In this manner, in some implementations, the processors 342 communicate the computed estimates, which are noted above, to other network devices or receiver stations through the network interfaces.

Figure 4:
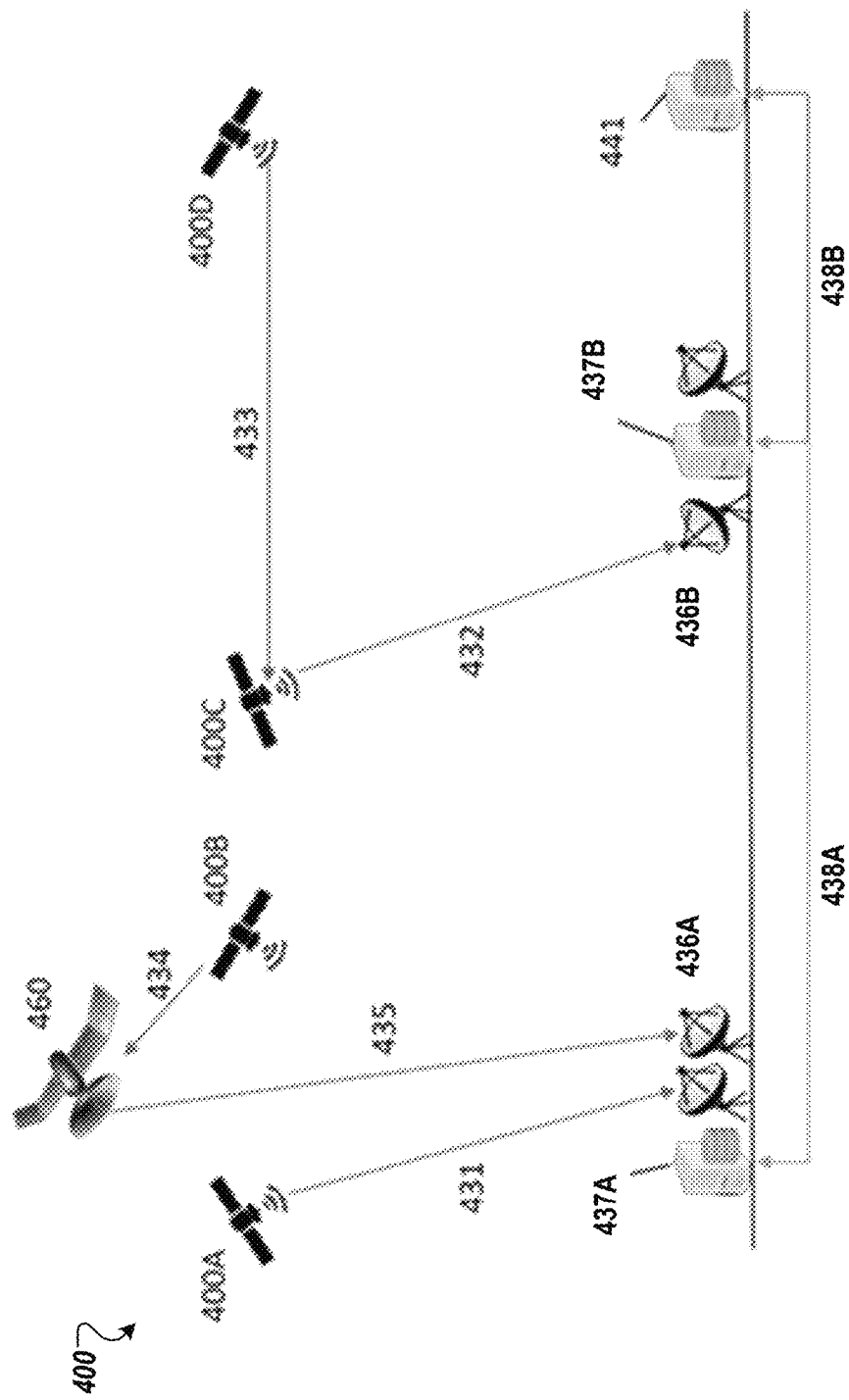
FIG. 4 illustrates an example of a distributed system for determining emitter locations, according to one or more implementations.

FIG. 4 illustrates an example of realization of a distributed system 400 including a communications bus between sensing devices 400A, 400B, 400C, and 400D and between a sensing device and an information combining node 441. In this example, the sensing devices or sensors are satellites, and the communications bus includes several possible types of radio communications links or optical communications links 431, 432, 433, 434, and 435. The system 400 includes one or more ground stations 437A and 437B that are connected to the information combining node 441.

In some implementations, the system 400 includes a communications satellite 460 that is operated by the same satellite operator as one or more of the sensing devices 400A, 400B, 400C, and 400D. In some implementations, the communications satellite is operated by a different satellite operator or commercially operated. The communications satellite 460 may move in a similar orbit as one or more of the sensing devices 400A, 400B, 400C, and 400D, or may move in a different orbit. For example, the communications satellite 460 may move along an orbit that is located at a higher or lower distance from ground than one or more of the sensing devices 400A, 400B, 400C, and 400D. One or more of the sensing devices 400A, 400B, 400C, and 400D may communicate with the communications satellite 460 through a communications link 434 to transmit metadata determined at the respective sensing devices (e.g., sensing device 400B). The communications satellite 460 transmits information (e.g., the metadata) to one or more of ground stations (e.g., ground station 437A) over radio or optical communications link 435.

The sensing devices 400A, 400B, 400C, and 400D transmit information (e.g., metadata) as described above via a communications bus to an information combining node 441. For example, the sensing devices 400A and 400C, respectively, transmit information via a direct downlink radio or optical link 431 and 432 to ground based antennas 436A and 436B of ground stations 437A and 437B. One or both of the ground stations 437A and 437B receive information such as metadata from sensing devices or communications satellite 460 and process the received metadata. In some implementations, the ground stations 437A and 437B transmit the received metadata or the processed information to another ground station through a communications link 438A, or to an information combining node 441 through a communications link 438B.

In some implementations, metadata generated by one sensing device is transferred through a communications link connected to another sensing device. For example, the sensing device 400D transmits information over a radio or optical cross-link 433 to the sensing device 400C, which then transmits the information over a radio or optical communications link 432 to the ground (e.g., ground station 437B).

In some implementations, when metadata information reaches a ground antenna 436A or 436B and a corresponding ground station 437A or 437B, the metadata information is transmitted to the information combining node 441. The information combining node 441 aggregates the metadata information from all or a portion of sensing devices corresponding to multiple observations of emissions. In some implementations, the metadata transmission to the information combining node 441 happens immediately as the metadata information is received at a ground antenna 436A or 436B and a corresponding ground station 437A or 437B. In some other implementations, for one or more ground antennas 436A and 436B and the corresponding ground stations 437A and 437B, the transmission of metadata to the information combining node 441 takes place after a finite delay following receipt of the metadata at the ground antenna 436A or 436B and the corresponding ground station 437A or 437B. In some implementations, the combining takes place after a finite delay prior to transmission from the sensor to the ground station. For example, there may be a delay before the sensing device 400A, 400B, 400C, or 400D can close a communications link (e.g., 431, 432, 433, or 435) and transmit metadata to the ground station 437A or 437B, where the metadata may be relayed to the combining node 441.

In some implementations, different ground antennas 436A and 436B, and corresponding ground stations 437A and 437B, transmit the same metadata received at the respective locations to the information combining node 441 at different times. For instance, the ground station 437A may transmit the metadata to the information combining node 441 at a first time instant, and the ground station 437B may transmit the metadata to the information combining node 441 at a second time instant that is greater or less than the first time instant. In some implementations, a ground station (e.g., ground station 437B) receives metadata from another ground station (e.g., ground station 437A) through a communications link (e.g., 438A) and transmits the received metadata to the information combining node 441 through a communications link (e.g., 438B).

In some implementations, the information combining node 441 is co-located at a ground station 437A or 437B. In such implementations, one or more of the ground stations 437A and 437B include components corresponding to those of the information combining node 441 such as one or more processors, a memory device, and one or more communications transponders. In some implementations, the information combining node 441 is co-located on one of the sensing devices 400A, 400B, 400C, or 400D. In such implementations, one or more of the sensing devices 400A, 400B, 400C, or 400D include components corresponding to those of the information combining node 441 such as one or more processors, a memory device, and one or more communications transponders.

Figure 5:
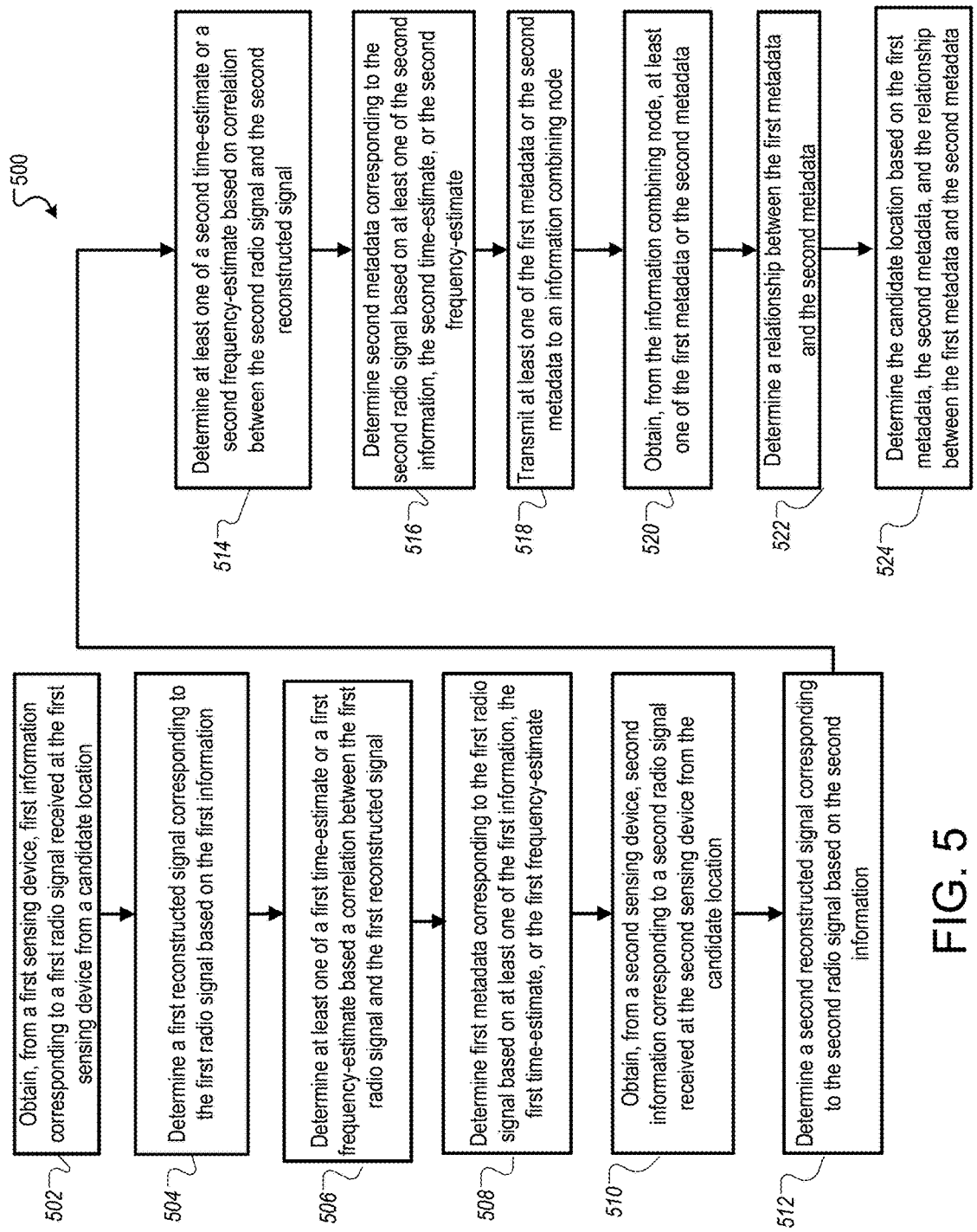
FIG. 5 illustrates an example of a process for determining emitter locations based on metadata corresponding to radio signals, according to one or more implementations.

FIG. 5 illustrates an example of a process 500 for generating metadata based on radio signals and determining a candidate location from which the radio signals were emitted, according to one or more implementations. The process 500 can be performed by components of the systems 200a, 200b, 300, or any suitable combination thereof. For example, the process 500 can be performed by two or more of the sensing devices 202, 202a, 202b, or 202c, and the information combining node 240, or by a suitable combination of the sensing devices and the information combining node 240. Accordingly, the following sections describe the process 500 with respect to the system 200a, 200b, or 300. For example, each sensing device 202a and 202b of the system 200b includes corresponding components in the sensing device 202 of the system 200a. However, the process 500 also can be performed by other suitable devices or systems.

In some implementations, the process 500 is performed by one or more processors associated with the respective device(s) performing the process 500. For example, the sensing device 202, or the sensing devices 202a, 202b, or 202c, can perform the process 500 by executing instructions corresponding to the process 500 that are stored in memory coupled to the respective sensing device. The instructions are executed by one or more processors coupled to the respective sensing device. Additionally or alternatively, in some implementations, the information combining node 240 can perform the process 500 by executing instructions corresponding to the process 500 that are stored in memory coupled to the information combining node 240. The instructions are executed by one or more processors coupled to the information combining node 240.

In some implementations, the process 500 is performed by a plurality of sensing devices, e.g., M sensing devices, where M is an integer greater than 2. For example, the process 500 can be performed by the sensing devices 202a, 202b and 202c, and additional sensing devices in the system 200b.

At 502, the system 200b obtains, from a first sensing device, first information corresponding to a first radio signal received at the first sensing device from a candidate location. For example, the sensing device 202a receives a first radio signal from the emitter corresponding to the candidate location. In some examples, the first radio signal is emitted through a radio channel 220a and received through an antenna 252 of the first sensing device 202a. In some implementations, the received radio signal is sent to a processor on board of the sensing device 202a.

At 504, the system 200b determines a first reconstructed signal corresponding to the first radio signal based on the first information. For example, a remodulator 262 of the first sensing device 202a generates a first reconstructed signal corresponding to the first radio signal using information such as contents data, signal and channel parameters, and the channel state information of the first radio signal. In some implementations, the information, for generating the first reconstructed signal, is determined by one or more of a digitizer 254, a signal detector 256, or a demodulator 258 of the first sensing device 202a. In some examples, the signal detector 256 and the demodulator 258 utilized a digitized data stream generated by the digitizer 254 corresponding to the first radio signal.

At 506, the system 200b determines at least one of a first time-estimate or a first frequency-estimate based correlation between the first radio signal and the first reconstructed signal. For example, the sensing device 202a computes a correlation (e.g., a cross-correlation) with the first reconstructed signal and the received radio signal to produce a precise correlation peak estimate for the first radio signal. In some examples, the sensing device 202a utilizes a matched filter 264 to compute the correlation. In some implementations, the fine time & frequency estimator 266 determines, based on results from the matched filter 264, a high accuracy estimate of time and frequency of the first radio signal received at the sensing device 202a. In some implementations, the first time-estimate or the first frequency-estimate is determined based on one or more cost metrics, different from the correlation described above, between the first radio signal and the first reconstructed signal.

At 508, the system 200b determines first metadata corresponding to the first radio signal based on at least one of the first information, the first time-estimate, or the first frequency-estimate. For example, the system 200b includes a data structure of the metadata including one or both of the first time-estimate and the first frequency-estimate. In some examples, the data structure may include one or more of the contents data, signal and channel parameters, and channel state information, which correspond to the information for generating the first reconstructed signal. In some implementations, the data structure of metadata may include a signal to noise value. In some examples, the metadata may be stored in a memory of the sensing device 202a or transmitted to downstream processes.

At 510, the system 200b obtains, from a second sensing device, second information corresponding to a second radio signal received at the second sensing device from the candidate location. For example, the sensing device 202b receives a second radio signal from the emitter corresponding to the candidate location. In some examples, the second radio signal is emitted through a radio channel 220b and received through an antenna 252 of the second sensing device 202b. In some implementations, the received radio signal is sent to a processor on board of the sensing device 202b.

At 512, the system 200b determines a second reconstructed signal corresponding to the second radio signal based on the second information. For example, a remodulator 262 of the second sensing device 202b generates a second reconstructed signal corresponding to the second radio signal using information such as contents data, signal and channel parameters, and the channel state information of the first radio signal. In some implementations, the information, for generating the second reconstructed signal, is determined by one or more of a digitizer 254, a signal detector 256, or a demodulator 258 of the second sensing device 202b. In some examples, the signal detector 256 and the demodulator 258 utilized a digitized data stream generated by the digitizer 254 corresponding to the second radio signal.

At 514, the system 200b determines at least one of a second time-estimate or a second frequency-estimate based a correlation between the second radio signal and the second reconstructed signal. For example, the sensing device 202b computes a correlation (e.g., a cross-correlation) with the second reconstructed signal and the received radio signal to produce a precise correlation peak estimate for the second radio signal. In some examples, the sensing device 202b utilizes a matched filter 264 to compute the correlation. In some implementations, the fine time & frequency estimator 266 determines, based on results from the matched filter 264 or another similar detector, a high accuracy estimate of time and frequency of the second radio signal received at the sensing device 202b. Alternatively or in addition, in some implementations, the second time-estimate or the second frequency-estimate is determined based on one or more cost metrics, different from the correlation described above, between the second radio signal and the second reconstructed signal.

At 516, the system 200b determines second metadata corresponding to the second radio signal based on at least one of the second information, the second time-estimate, or the second frequency-estimate. For example, the system 200b includes a data structure of the metadata including one or both of the second time-estimate and the second frequency-estimate. In some examples, the data structure may include one or more of the contents data, signal and channel parameters, and channel state information, which correspond to the information for generating the second reconstructed signal. In some implementations, the data structure of metadata may include a signal to noise value. In some examples, the metadata may be stored in a memory of the sensing device 202b or transmitted to downstream processes.

At 518, the system 200b transmits at least one of the first metadata or the second metadata to an information combining node. For example, the first sensing device 202a transmits the first metadata to an information combining node 240, and the second sensing device 202b transmits the second metadata to the information combining node 240. In some implementations, one or both of the first and second sensing devices 202a and 202b may transmit the respective metadata to another sensing device that transmits the respective metadata to the information combining node 240. In some cases, one of the first sensing device 202a, the second sensing device 202b, or another sensing device may correspond to the information combining node 240. For instance, the second sensing device 202b receives the first metadata from the first sensing device 202a and performs processes corresponding to the information combining node 240.

At 520, the system 200b obtains, from the information combining node, at least one of the first metadata or the second metadata. For example, the information combining node 240 obtains, through the communication bus 280, the first metadata from the first sensing device 202a, the second metadata from the second sensing device 202b, or both. In examples where one or more of the first and second metadata were transmitted to an intermediate sensing device (e.g., a third party satellite), the information combining node 240 may obtain the first metadata or the second metadata from the intermediate sensing device.

At 522, referring to FIG. 3, the system 300 determines a relationship between the first metadata and the second metadata. For example, one or more processors 342 of the information combining node 340 may determine a distance metric corresponding to the metadata 360*a* and 360*b* using the TOA data included in the metadata 360*a* and 360*b*. For example, the distance metric may be a temporal distance value corresponding to a time difference between the TOA values of the respective metadata. In some implementations, the one or more processors 342 may determine a distance metric corresponding to the metadata 360*a* and 360*b* using the FOA data included in the respective metadata. For example, the distance metric may be a spectral distance value corresponding to a frequency difference between the FOA values of the respective metadata.

At 524, the system 300 determines the candidate location based on the first metadata, the second metadata, and the relationship between the first metadata and the second metadata. For example, the one or more processor 342 determine the candidate location based on results of the time & frequency distance calculation process 344. In some examples, the candidate location of the emitter may be determined based on a ratio of the TOA included in the first metadata 360*a* and the TOA included in the second metadata 360*b*. In some examples, the system 300 may utilize one or more of additional metadata (e.g., metadata 360*c*), additional information 354 about the emitter, or telemetry information 352 such as velocities or trajectories of the sensing devices that transmitted the respective metadata to improve estimation of the candidate location based on the first metadata 360*a* and the second metadata 360*b*.

Figure 6:
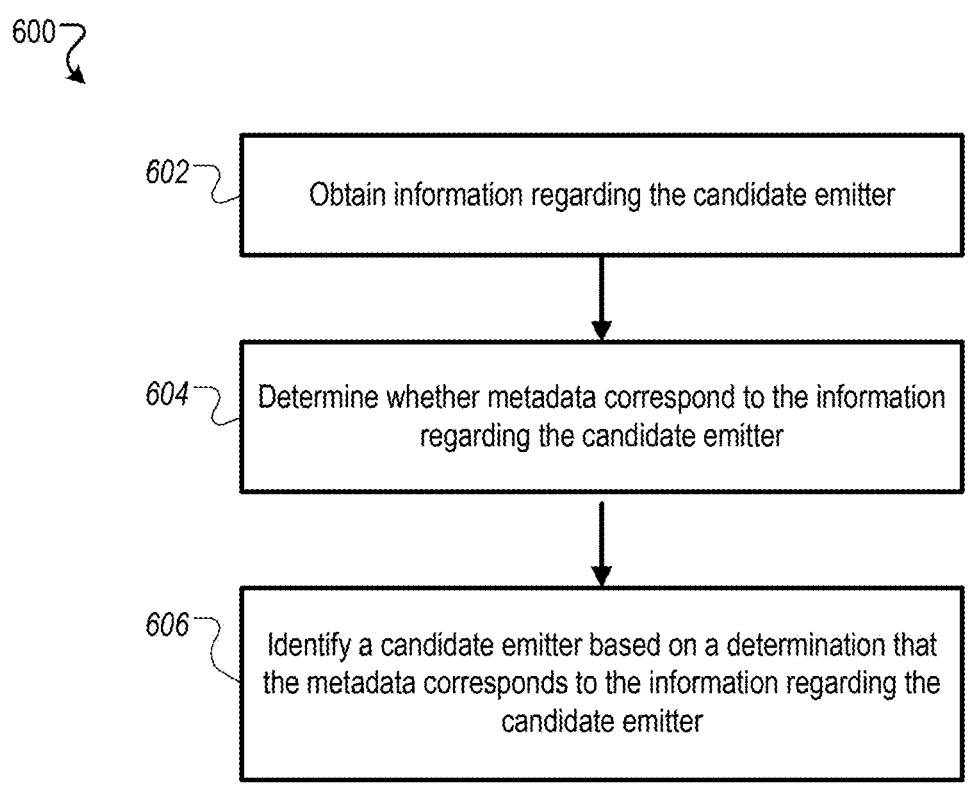
FIG. 6 illustrates an example of a process for identifying a candidate location at an information combining node, according to one or more implementations.

FIG. 6 illustrates an example of a process 600 for identifying a candidate emitter based on metadata received at an information combining node, according to one or more implementations. The process 600 can be performed by components of the system 300. For example, the information combining node 340 can perform the process 600 by executing instructions corresponding to the process 600 that are stored in memory (e.g., memory 350) coupled to the information combining node 340. The instructions are executed by one or more processors 342 coupled to the information combining node 340.

At 602, the system 300 obtains information regarding the candidate emitter. For example, one or more processors 342 of the information combining node 340 obtains the information regarding the candidate emitter from one or more of the first metadata 360*a*, the second metadata 360*b*. In some examples, the one or more processors 342 may obtain the information regarding the candidate emitter before receiving the first metadata 360*a* or the second metadata 360*b*. In other examples, the one or more processors 342 may obtain the information after receipt of the first metadata 360*a* or the second metadata 360*b*, for example, by searching an internet source or database that specifies a type of the candidate emitter, a travel schedule of the candidate emitter, or a frequency band of an emission from the candidate emitter.

At 604, the system 300 determines whether metadata correspond to the information regarding the candidate emitter. For example, the one or more processors 342 determines whether one or both of the first metadata 360*a* and the second metadata 360*b* corresponds to the information regarding the candidate emitter. For instance, the one or more processors 342 compares signal parameters such as frequency ranges or modulation parameters (e.g., symbol rates, constellations, or shapes, among others) included the metadata 360*a* and 360*b* with corresponding information included in the information regarding the candidate emitter. In some cases, contents data included in the metadata 360*a* and 360*b* may be utilized to determine whether the metadata correspond to the information regarding the candidate emitter. For example, the one or more processors 342 may compare voice or acoustic contents included in the metadata 360*a* and 360*b* with the information regarding the candidate emitter that includes voice or other acoustic contents of various emitters.

At 606, the system 300 identifies a candidate emitter based on a determination that the metadata corresponds to the information regarding the candidate emitter. For example, the one or more processors 342 determines a candidate emitter based on a determination that one or both of the first metadata 360*a* and the second metadata 360*b* corresponds to the information regarding the candidate emitter. In some examples, the candidate emitter may include a plurality of candidate emitters. For example, the first metadata data 360*a* may correspond to a first portion of the plurality of candidate emitters, and the second metadata 360*b* may corresponds to a second portion of the plurality of candidate emitters. In some cases, identifying a candidate emitter may include identifying one or more common candidate emitters from the first and second portions of the plurality of candidate emitters. In some examples, the plurality of candidate emitters may include a relevance score corresponding to results of comparison between the metadata 360*a*/360*b* with the information regarding the candidate emitter. In these examples, identifying a candidate emitter may include identifying one or more candidate emitters based on the relevance score (e.g., $1^{st}$ highest score emitter, five highest score emitters, etc.).

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and the computer program can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   obtaining, from a first sensing device, first information corresponding to a first radio signal received at the first sensing device from a candidate location;
   determining a first reconstructed signal corresponding to the first radio signal based on the first information;
   determining at least one of a first time-estimate or a first frequency-estimate based on a correlation between the first radio signal and the first reconstructed signal;
   determining first metadata corresponding to the first radio signal based on at least one of the first information, the first time-estimate, or the first frequency-estimate;
   obtaining, from a second sensing device, second information corresponding to a second radio signal received at the second sensing device from the candidate location;
   determining a second reconstructed signal corresponding to the second radio signal based on the second information;
   determining at least one of a second time-estimate or a second frequency-estimate based on correlation between the second radio signal and the second reconstructed signal;
   determining second metadata corresponding to the second radio signal based on at least one of the second information, the second time-estimate, or the second frequency-estimate;
   transmitting at least one of the first metadata or the second metadata to an information combining node;
   obtaining, from the information combining node, at least one of the first metadata or the second metadata;
   determining a relationship between the first metadata and the second metadata; and
   determining the candidate location based on the first metadata, the second metadata, and the relationship between the first metadata and the second metadata,
   wherein transmitting at least one of the first metadata or the second metadata to the information combining node comprises restricting transmission of the first radio signal and the second radio signal to the information combining node based on a bandwidth or storage of the first sensing device, the second sensing device, or the information combining node,
   wherein determining the first reconstructed signal comprises minimizing a first cost metric corresponding to a difference between the first reconstructed signal and the first radio signal, and
   wherein determining the second reconstructed signal comprises minimizing a second cost metric corresponding to a difference between the second reconstructed signal and the second radio signal.

2. The method of claim 1, wherein determining the candidate location comprises determining the candidate location based on at least one of the first metadata received at the information combining node or the second metadata received at the information combining node.

3. The method of claim 1, wherein a bandwidth for transmitting the first metadata from the first sensing device is less than a bandwidth for transmitting the first radio signal from the first sensing device,
   wherein a bandwidth for transmitting the second metadata from the second sensing device is less than a bandwidth for transmitting the second radio signal from the second sensing device,
   wherein a memory space for storing the first metadata from the first sensing device is less than a memory space for storing the first radio signal from the first sensing device, and wherein a memory space for storing the second metadata from the second sensing device is less than a memory space for storing the second radio signal from the second sensing device.

4. The method of claim 1, wherein transmitting at least one of the first metadata or the second metadata to the information combining node comprises transmitting the first metadata and the second metadata through a communications bus communicably coupled to the information combining node.

5. The method of claim 4, wherein the communications bus comprises a band of frequencies that includes at least one of a VHF-band, a UHF-band, an S-band, a Ku-band, a Ka-band, or an X-band that are configured to carry a radio signal.

6. The method of claim 1, wherein obtaining the first information comprises:
   generating a data stream by digitizing the first radio signal; and
   obtaining, from the data stream, information derived from the first radio signal.

7. The method of claim 6, wherein obtaining the information derived from the radio first signal comprises obtaining, from the data stream, at least one of a time of arrival of the first radio signal at the first sensing device, a frequency of the first radio signal at the time of arrival, a frequency offset associated with the first radio signal, a signal to noise ratio associated with the first radio signal, information bits included in the data stream corresponding to the first radio signal, or a signal parameter that defines one or more features of the first radio signal.

8. The method of claim 7, wherein determining the first reconstructed signal comprises determining the first reconstructed signal based on at least one of the time of arrival of the first radio signal at the first sensing device, the frequency of the first radio signal at the time of arrival, the signal to noise ratio of the first radio signal, the signal parameter that defines the one or more features of the first radio signal, the information bits included in the first radio signal, or the signal parameter that defines the one or more features of the first radio signal.

9. The method of claim 7, wherein determining the first metadata corresponding to the first radio signal comprises determining descriptive information corresponding to at least one of the time of arrival of the first radio signal at the first sensing device, the frequency of the first radio signal at the time of arrival, the signal to noise ratio of the first radio signal, the information bits included in the first radio signal, or the signal parameter that defines the one or more features of the first radio signal.

10. The method of claim 1, wherein obtaining the second information comprises:
    generating a data stream by digitizing the second radio signal; and
    obtaining, from the data stream, information derived from the second radio signal.

11. The method of claim 10, wherein obtaining the information derived from the second radio signal comprises obtaining, from the data stream, at least one of a time of arrival of the second radio signal at the second sensing device, a frequency of the second radio signal at the time of arrival, a frequency offset associated with the second radio signal, a signal to noise ratio associated with the second radio signal, information bits included in the data stream corresponding to the second radio signal, or a signal parameter that defines one or more features of the second radio signal.

12. The method of claim 11, wherein determining the second reconstructed signal comprises determining the second reconstructed signal based on at least one of the time of arrival of the second radio signal at the second sensing device, the frequency of the second radio signal at the time of arrival, the signal to noise ratio of the second radio signal, the signal parameter that defines the one or more features of the second radio signal, the information bits included in the second radio signal, or the signal parameter that defines the one or more features of the second radio signal.

13. The method of claim 11, wherein determining the second metadata corresponding to the second radio signal comprises determining descriptive information corresponding to at least one of the time of arrival of the second radio signal at the second sensing device, the frequency of the second radio signal at the time of arrival, the signal to noise ratio of the second radio signal, or the information bits included in the data stream corresponding to the second radio signal.

14. The method of claim 1, wherein determining the first metadata corresponding to the first radio signal comprises determining descriptive information corresponding to at least one of a first time of arrival at which the first radio signal arrived at the first sensing device, or a first frequency of arrival of the first radio signal received at the first sensing device at the first time of arrival, and
   wherein determining the second metadata corresponding to the second radio signal comprises determining descriptive information corresponding to at least one of a second time of arrival at which the second radio signal arrived at the second sensing device, or a second frequency of arrival of the second radio signal received at the second sensing device at the second time of arrival.

15. The method of claim 14, wherein determining the candidate location comprises:
    obtaining information regarding a trajectory of at least one of the first sensing device or the second sensing device; and
    identifying a candidate emitter corresponding to the first radio signal and the second radio signal based on at least one of the information regarding the trajectory of at least one of the first sensing device or the second sensing device, the relationship between the first metadata and the second metadata, the first metadata, or the second metadata.

16. The method of claim 15, wherein identifying the candidate emitter comprises:
    obtaining information regarding the candidate emitter;
    determining whether the first metadata or the second metadata corresponds to the information regarding the candidate emitter; and
    identifying the candidate emitter based on a determination that the first metadata or the second metadata corresponds to the information regarding the candidate emitter,
    wherein determining the candidate location further comprises determining the candidate location from estimated locations corresponding to the information regarding the candidate emitter, the trajectory of at least one of the first sensing device or the second sensing device, the relationship between the first metadata and the second metadata, the first metadata, and the second metadata.

17. The method of claim 16, wherein the information regarding the candidate emitter includes at least one of a type of the candidate emitter, a history of locations of the candidate emitter, a travel schedule of the candidate emitter, a frequency band of an emission from the candidate emitter, a frequency of the emission, a frequency offset of the emission, a pulse shape of the emission, a modulation parameter of the emission, or an acoustic or voice content included in the emission.

18. The method of claim 16, wherein obtaining the information regarding the candidate emitter comprises obtaining the information regarding the candidate emitter from at least one of the first metadata, the second metadata, the first sensing device, the second sensing device, another sensing device, an information repository, or an internet source that specifies a type of the candidate emitter, a travel schedule of the candidate emitter, or a frequency band of an emission from the candidate emitter.

19. The method of claim 16, further comprising:
storing information corresponding to the candidate emitter and the candidate location in a non-transitory storage medium.

20. The method of claim 16, further comprising:
transmitting information corresponding to the candidate emitter and the candidate location to a communications bus or to an information processing node.

21. The method of claim 1, wherein the first sensing device and the second sensing device include at least one of a Low Earth Orbit (LEO) satellite, a Medium Earth Orbit (MEO) satellite, a Geosynchronous Orbit (GEO) satellite, a Highly Elliptical Orbit (HEO) satellite, a nano satellite, an unmanned aerial vehicle (UAV), a terrestrial vehicle, a spacecraft, or a mobile platform.

22. The method of claim 1, wherein the first sensing device includes the second sensing device and is configured to receive a plurality of radio signals, and
wherein obtaining the second information corresponding to the second radio signal comprises obtaining the second information corresponding to the second radio signal received at the first sensing device.

23. The method of claim 1, wherein the first sensing device or the second sensing device includes the information combining node, and
wherein transmitting at least one of the first metadata or the second metadata to the information combining node comprises transmitting at least one of the first metadata or the second metadata to one of the first sensing device and the second sensing device that includes the information combining node.

24. The method of claim 1, wherein the first cost metric comprises a mean squared value corresponding to the difference between the first reconstructed signal and the first radio signal, and
wherein the second cost metric comprises a mean squared value corresponding to the difference between the second reconstructed signal and the second radio signal.

25. The method of claim 1, wherein the information combining node includes a plurality of information combining nodes that comprise a data center, a ship control center, or a satellite control center.

26. A non-transitory computer-readable medium storing instructions that, when executed by one or more processors, are configured to cause the one or more processors to perform operations comprising:
obtaining, from a first sensing device, first information corresponding to a first radio signal received at the first sensing device from a candidate location;
determining a first reconstructed signal corresponding to the first radio signal based on the first information;
determining at least one of a first time-estimate or a first frequency-estimate based on a correlation between the first radio signal and the first reconstructed signal;
determining first metadata corresponding to the first radio signal based on at least one of the first information, the first time-estimate, or the first frequency-estimate;
obtaining, from a second sensing device, second information corresponding to a second radio signal received at the second sensing device from the candidate location;
determining a second reconstructed signal corresponding to the second radio signal based on the second information;
determining at least one of a second time-estimate or a second frequency-estimate based on correlation between the second radio signal and the second reconstructed signal;
determining second metadata corresponding to the second radio signal based on at least one of the second information, the second time-estimate, or the second frequency-estimate;
transmitting at least one of the first metadata or the second metadata to an information combining node;
obtaining, from the information combining node, at least one of the first metadata or the second metadata;
determining a relationship between the first metadata and the second metadata; and
determining the candidate location based on the first metadata, the second metadata, and the relationship between the first metadata and the second metadata,
wherein transmitting at least one of the first metadata or the second metadata to the information combining node comprises restricting transmission of the first radio signal and the second radio signal to the information combining node based on a bandwidth of the first sensing device, the second sensing device, or the information combining node,
wherein determining the first reconstructed signal comprises minimizing a first cost metric corresponding to a difference between the first reconstructed signal and the first radio signal, and
wherein determining the second reconstructed signal comprises minimizing a second cost metric corresponding to a difference between the second reconstructed signal and the second radio signal.

27. The non-transitory computer-readable medium of claim 26, wherein a bandwidth for transmitting the first metadata from the first sensing device is less than a bandwidth for transmitting the first radio signal from the first sensing device,
wherein a bandwidth for transmitting the second metadata from the second sensing device is less than a bandwidth for transmitting the second radio signal from the second sensing device,
wherein a memory space for storing the first metadata from the first sensing device is less than a memory space for storing the first radio signal from the first sensing device, and
wherein a memory space for storing the second metadata from the second sensing device is less than a memory space for storing the second radio signal from the second sensing device.

28. A system comprising:
a first sensing device and a second sensing device;
one or more processors; and a storage medium storing instructions that, when executed by the one or more processors, are configured to cause the one or more processors to perform operations comprising:
  obtaining, from the first sensing device, first information corresponding to a first radio signal received at the first sensing device from a candidate location;
  determining a first reconstructed signal corresponding to the first radio signal based on the first information;
  determining at least one of a first time-estimate or a first frequency-estimate based on a correlation between the first radio signal and the first reconstructed signal;
  determining first metadata corresponding to the first radio signal based on at least one of the first information, the first time-estimate, or the first frequency-estimate;
  obtaining, from the second sensing device, second information corresponding to a second radio signal received at the second sensing device from the candidate location;
  determining a second reconstructed signal corresponding to the second radio signal based on the second information;
  determining at least one of a second time-estimate or a second frequency-estimate based on correlation between the second radio signal and the second reconstructed signal;
  determining second metadata corresponding to the second radio signal based on at least one of the second information, the second time-estimate, or the second frequency-estimate;
  transmitting at least one of the first metadata or the second metadata to an information combining node;
  obtaining, from the information combining node, at least one of the first metadata or the second metadata;
  determining a relationship between the first metadata and the second metadata; and
  determining the candidate location based on the first metadata, the second metadata, and the relationship between the first metadata and the second metadata,
  wherein transmitting at least one of the first metadata or the second metadata to the information combining node comprises restricting transmission of the first radio signal and the second radio signal to the information combining node based on a bandwidth of the first sensing device, the second sensing device, or the information combining node,
  wherein determining the first reconstructed signal comprises minimizing a first cost metric corresponding to a difference between the first reconstructed signal and the first radio signal, and
  wherein determining the second reconstructed signal comprises minimizing a second cost metric corresponding to a difference between the second reconstructed signal and the second radio signal.

29. The system of claim 28, wherein a bandwidth for transmitting the first metadata from the first sensing device is less than a bandwidth for transmitting the first radio signal from the first sensing device,
  wherein a bandwidth for transmitting the second metadata from the second sensing device is less than a bandwidth for transmitting the second radio signal from the second sensing device,
  wherein a memory space for storing the first metadata from the first sensing device is less than a memory space for storing the first radio signal from the first sensing device, and
  wherein a memory space for storing the second metadata from the second sensing device is less than a memory space for storing the second radio signal from the second sensing device.

* * * * *